US012692844B2

(12) United States Patent (10) Patent No.: US 12,692,844 B2
Sanz Pascual et al. (45) Date of Patent: Jul. 28, 2026

(54) LIGHTNING-PROTECTION DEVICE IN A MODULAR BLADE

(71) Applicant: NABRAWIND TECHNOLOGIES, S.L., Pamplona (ES)

(72) Inventors: Eneko Sanz Pascual, Pamplona (ES); Javier Monreal Lesmes, Zizur Mayor (ES); Ion Arocena De La Rúa, Pamplona (ES); Arantxa Esparza Zabalza, Pamplona (ES)

(73) Assignee: NABRAWIND TECHNOLOGIES, S.L., Pamplona (ES)

( * ) Notice: Subject to any disclaimer, the term of this patent is extended or adjusted under 35 U.S.C. 154(b) by 0 days.

(21) Appl. No.: 19/110,786

(22) PCT Filed: Sep. 20, 2022

(86) PCT No.: PCT/ES2022/070598
§ 371 (c)(1),
(2) Date: Mar. 11, 2025

(87) PCT Pub. No.: WO2024/062139
PCT Pub. Date: Mar. 28, 2024

(65) Prior Publication Data
US 2026/0071610 A1 Mar. 12, 2026

(51) Int. Cl.
*F03D 80/30* (2016.01)
*F03D 1/06* (2006.01)

(52) U.S. Cl.
CPC ........... *F03D 80/30* (2016.05); *F03D 1/0677* (2023.08)

(58) Field of Classification Search
CPC ............................... F03D 80/30; F03D 1/0677
See application file for complete search history.

(56) References Cited

U.S. PATENT DOCUMENTS

| 8,967,976 B2 * | 3/2015 | Pascual | F03D 1/0675 |
| | | | 416/226 |
| 10,202,966 B2 * | 2/2019 | Lipka | F03D 80/30 |

(Continued)

FOREIGN PATENT DOCUMENTS

| CA | 3151099 A1 * | 2/2021 | F03D 80/30 |
| CN | 119948255 A * | 5/2025 | F03D 80/301 |

(Continued)

OTHER PUBLICATIONS

International Search Report (with English translation) and Written Opinion issued in PCT/ES2022/070598 on Jan. 19, 2023 (9 pages).

*Primary Examiner* — Pedro J Cuevas
(74) *Attorney, Agent, or Firm* — DiPerna Law Firm, P.C.

(57) ABSTRACT

A lightning-protection device in a modular blade that connects the outboard module, where the lightning strikes, to the inboard module through which the lightning is conducted to the hub, and includes the lightning down conductor cable. The device is an elastic element with greater electrical conductivity than the adhesive used to affix the inserts in holes previously drilled inside the carbon fiber and that make up the metal joint of the modular blade. The device is an elastomer with a preferably toroidal shape thar surrounds each and every one of the metal elements that make up the joint of the blade and covers the gap formed between the carbon fiber of the cap and the aforementioned metal elements. The use of other shapes and other conductive materials that allow its geometry to be elastic is an option.

7 Claims, 5 Drawing Sheets

(56)                References Cited

U.S. PATENT DOCUMENTS

| | | | | |
|---|---|---|---|---|
| 10,443,579 | B2 * | 10/2019 | Tobin | F03D 80/30 |
| 10,767,624 | B2 * | 9/2020 | Monreal Lesmes | F03D 1/0633 |
| 11,786,999 | B2 * | 10/2023 | Monreal Lesmes | B25B 29/02 |
| | | | | 81/57.38 |
| 11,815,064 | B2 * | 11/2023 | Jansen | F03D 13/30 |
| 11,933,265 | B2 * | 3/2024 | Ponnada | F03D 1/0675 |
| 11,976,627 | B2 * | 5/2024 | Sanz Pascual | F03D 1/0675 |
| 12,338,797 | B2 * | 6/2025 | Sanz Pascual | F03D 80/30 |
| 2009/0116962 | A1 * | 5/2009 | Pedersen | F03D 7/02 |
| | | | | 416/61 |
| 2018/0135602 | A1 * | 5/2018 | Tobin | F03D 1/0675 |
| 2018/0274521 | A1 | 9/2018 | Akhtar et al. | |
| 2019/0032634 | A1 * | 1/2019 | Monreal Lesmes | F03D 1/0675 |
| 2019/0195203 | A1 * | 6/2019 | Fujioka | F03D 1/0675 |
| 2020/0095983 | A1 * | 3/2020 | Girschig | F03D 80/507 |
| 2020/0316733 | A1 * | 10/2020 | Monreal Lesmes | B23P 19/067 |
| 2021/0079895 | A1 * | 3/2021 | Whitehouse | F03D 1/0675 |
| 2022/0282707 | A1 * | 9/2022 | Jansen | F03D 13/30 |
| 2023/0142232 | A1 * | 5/2023 | Ponnada | F03D 80/30 |
| | | | | 416/223 R |
| 2023/0265827 | A1 * | 8/2023 | Sanz Pascual | F03D 1/0675 |
| | | | | 416/223 R |
| 2023/0272782 | A1 * | 8/2023 | Sanz Pascual | F03D 1/0675 |
| | | | | 174/2 |
| 2025/0102575 | A1 * | 3/2025 | Putrams | G01R 31/3274 |

FOREIGN PATENT DOCUMENTS

| | | | | | |
|---|---|---|---|---|---|
| DE | 102019122583 | A1 * | 2/2021 | | F03D 80/30 |
| DK | 173607 | B1 * | 4/2001 | | F03D 80/30 |
| EP | 2226497 | A1 * | 9/2010 | | F03D 1/0675 |
| EP | 3879091 | A1 * | 9/2021 | | F03D 80/30 |
| EP | 4018092 | B1 * | 10/2023 | | F03D 80/30 |
| EP | 4426937 | B1 * | 7/2025 | | G01R 31/3274 |
| EP | 4592524 | A1 * | 7/2025 | | F03D 80/301 |
| ES | 2898689 | T3 | 8/2021 | | |
| ES | 2980743 | T3 * | 10/2024 | | F03D 80/30 |
| JP | 2022545198 | A * | 10/2022 | | F03D 80/30 |
| JP | 7340092 | B2 * | 9/2023 | | F03D 80/30 |
| WO | WO-2013084370 | A1 * | 6/2013 | | H02G 13/40 |
| WO | 2020065368 | A1 | 4/2020 | | |
| WO | WO-2021032846 | A1 * | 2/2021 | | F03D 13/30 |
| WO | WO-2021180389 | A1 * | 9/2021 | | F03D 1/0675 |
| WO | 2022042809 | A1 | 3/2022 | | |
| WO | WO-2024062139 | A1 * | 3/2024 | | F03D 80/301 |

* cited by examiner

LIGHTNING-PROTECTION DEVICE IN A MODULAR BLADE

CROSS-REFERENCE TO RELATED APPLICATION

This application is a National Phase application under 35 U.S.C. 371 of International Application No. PCT/ES2022/070598 filed on Sep. 20, 2022, the disclosure of which is incorporated herein in its entirety by reference.

FIELD OF INVENTION

The present invention relates to a lightning protection device for the metal joining of a modular blade consisting of two parts: the tip area or outboard module, where the lightning strikes and is conducted to the blade joint, and the root area or inboard module where the lightning is conducted from the joint to the hub of the wind turbine.

BACKGROUND

For the protection system against lightning strikes on a wind turbine blade to be effective, all conductive elements must be in equipotential connection, electrically connected to the lightning transmission cable. Both the carbon fibre, which is a conductive material, and the metallic connection that is also conductive, must be equipotentialized. If conductive elements were left isolated, there would be several problems, such as the very high potential difference that is created between them due to the induction phenomena caused by the lightning as it passes through the lightning rod system, or the evacuation of the lightning in the case of striking on a conductive element not connected to the down conductor.

The parts of the blade to be joined are made of composite material, inside which are housed inserts that are glued into holes previously machined in the composite material laminates. One or more intermediate metal elements anchored to the inserts by one or more bolts complete the union.

When the composite material where the metal inserts are housed is fibreglass, lightning transmission is simple, since fibreglass is not electrically conductive. But when the composite material is carbon fibre, lightning transmission is complicated, since the carbon fibre is electrically conductive and is separated from the inserts only by the thin layer of adhesive (non-conductive) that is used to glue it. Although the blades have several connections between the carbon fibre laminates and the down conductor, there is a risk that some of the lightning current transmitted by the carbon laminate will pass through the thin layer of adhesive and be conducted to the metal insert. This may occur because the waveform of the lightning current has a first phase where the current grows at high speed, so it tries to conduct itself, not along the path of least resistance (the connection between the carbon and the cable), but along the path of least inductance (the connection between the laminate and the insert, once the dielectric strength of the adhesive is broken). Passing through the adhesive can generate an increase in its temperature and affect its properties. Once the peak of the waveform is reached, the current drops at a slower rate, so it will preferentially pass through the path of least resistance (the connection between the carbon and the wire).

The patent WO2022042809A1 deals with electrically connecting the metal insert and the blade laminate, which is conductive of electricity. By forming the electrical path between the metal insert and the electrically conductive material on the surface of the hole, a clear path for current is generated that prevents uncontrolled passage through the adhesive. Another novel way to maintain the integrity of the joint is by using a device that prevents deterioration of the adhesive used to bond the insert. Said device is arranged between the conductive laminate of the inboard module and the intermediate metallic element and between the intermediate metallic element and the conductive laminate of the outboard module. Both in the upper shell of the blade and in the lower one.

DESCRIPTION

The present invention complements the lightning protection system of a blade with conductive laminates connected at various points to a down conductor cable, with a device that conducts the small percentage of the current transmitted by the conductive laminates of the blade that is not diverted to the cable during the high intensity peaks reached at the beginning of the impact and continues through the carbon fibre and through the metal joint.

It is an object of the invention that the claimed device is an elastic element with greater electrical conductivity than that of the adhesive used to glue the inserts to the carbon fibre of the modular blade.

And it is another object of the invention that the device is arranged in the gap formed between the conductive laminate of the blade and the intermediate elements of the metal joint, surrounding the inserts with its toroidal shape.

From the above-described, the following advantages result: avoiding damage to the adhesive and the carbon fibre that houses the threaded inserts, using a system that is easy to place during the blade assembly process and that this device, being elastic, guarantees contact during the assembly and operation of the blade.

BRIEF DESCRIPTION OF THE DRAWINGS

A brief description will be given below for a series of drawings useful for better understanding the invention and that expressly relate to an embodiment of said invention that is presented as a non-limiting example thereof.

DETAILED DESCRIPTION

Figure 1:
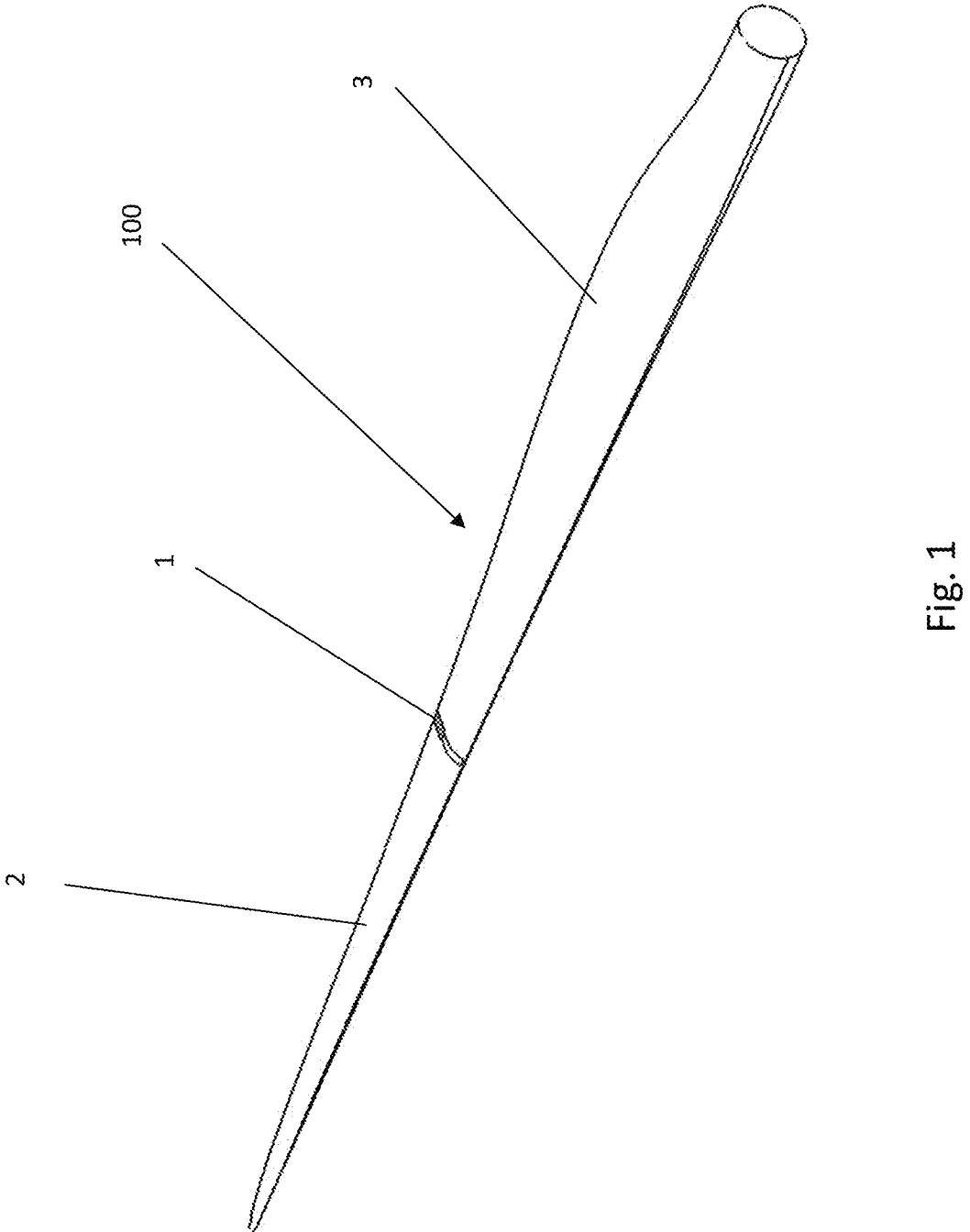
FIG. 1 represents the outline of a modular blade with the two parts to be joined: the outboard and the inboard.

As shown in FIG. 1, the modular blade (100) comprises a joining area (1) that separates the blade into two parts: the tip of the blade or outboard module (2) and the root of the blade or inboard module (3). The modularization of blades is applied to large blades where the transportation of the entire blade becomes very complex or practically impossible. On the contrary, the joining area (1) is very small so as not to condemn the modular blade (100) with more weight than is due. The blade has an internal structure formed by two caps and one or two webs of composite material, which make up an internal beam on which the upper and lower shells are arranged.

Figure 2:
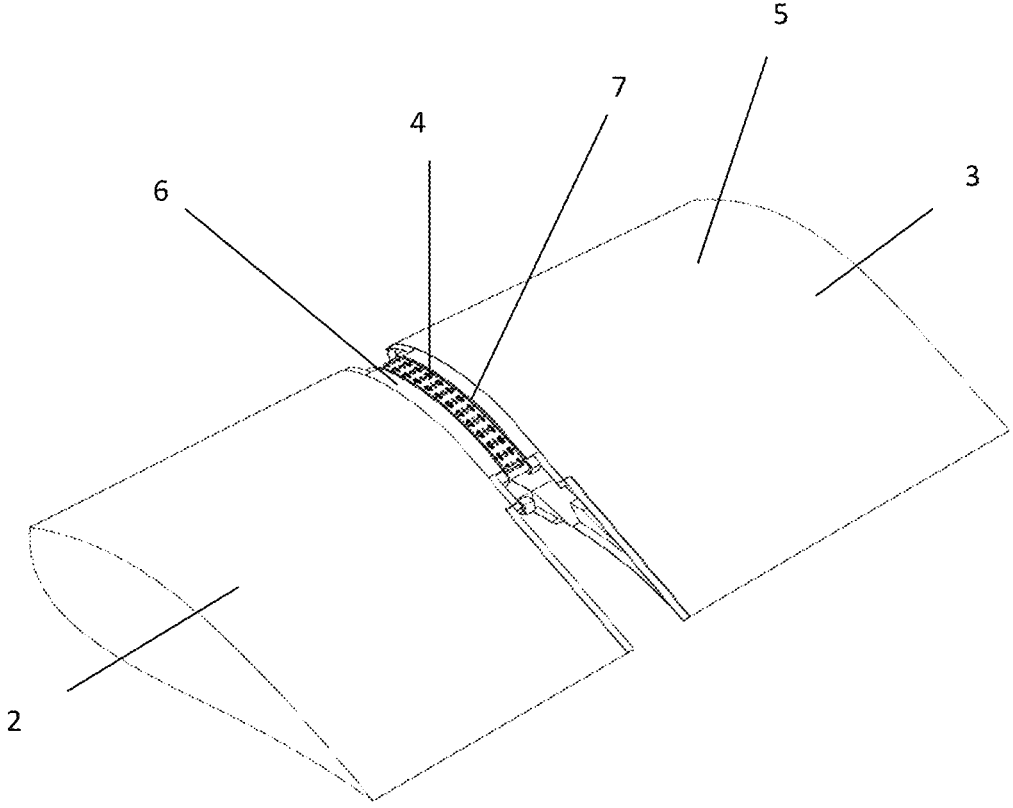
FIG. 2 shows a detail of the union of a modular blade.

FIG. 2 shows the intermediate metal elements (4) that make up the union of this modular blade (100). Said intermediate metal elements (4) are arranged in the upper cap (5) and in the lower cap (not visible in the figure). The material used for the cap laminates in the joint area (1) is carbon fibre (6), a highly resistant and electrically conductive composite material.

The modular blades have a cable to transmit the lightning, but part of its current is also transmitted through the laminates of the carbon fibre cap, which are connected to the cable at various points. Part of this current transmitted by the laminates of the carbon fibre cap can pass through the metal joint.

Figure 3:
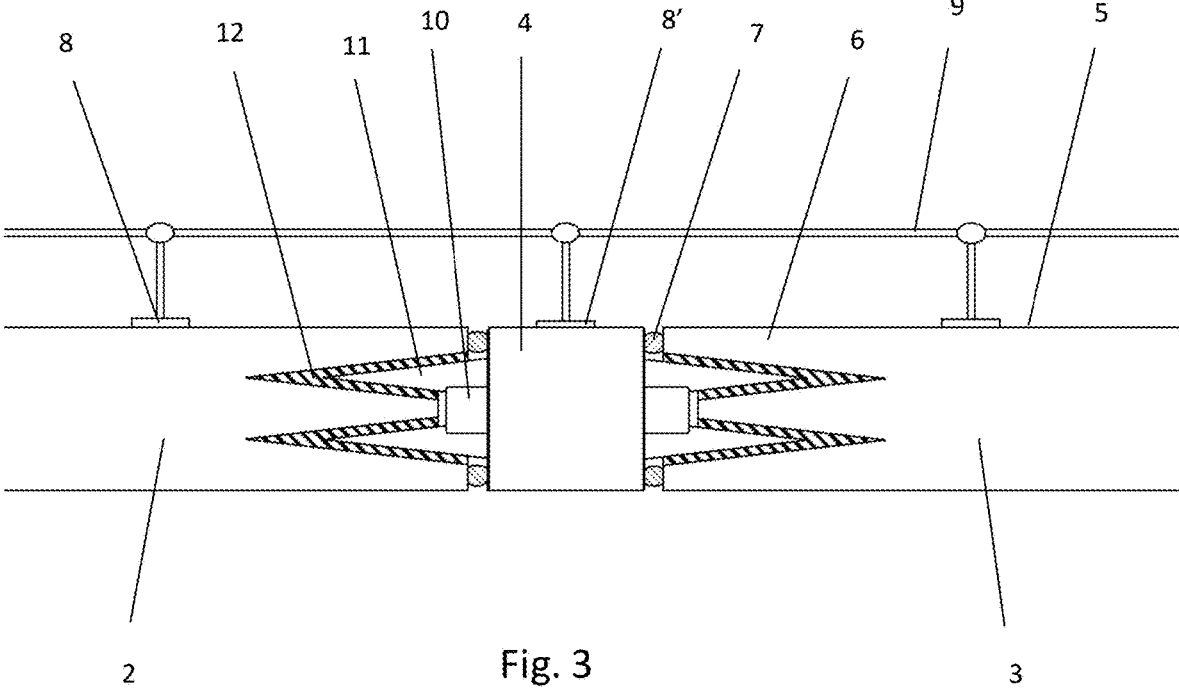
FIG. 3 shows a section of one of the metal elements that constitutes the joint, accompanied by the lightning cable and its intermediate connection points.

FIG. 3 shows the section of the blade joint connection. The metal joint is made up of a metal element (4) that includes one or several bolts (10) screwed to their corresponding inserts (11), which in turn are glued by means of a non-conductive adhesive (12) to the carbon fibre (6) of the joining area (1). To prevent deterioration of the adhesive (12), for each joining element there is a spark gap (7) between the carbon fibre (6) of the inboard and the metal element (4) and another spark gap (7) between the metal element (4) and the carbon fibre (6) of the outboard. These spark gaps (7) are placed during the assembly of the metal joint and are mounted on both the upper cap (5) and the lower one.

The conductive laminates of said cap (5) have several joining points (8) that allow their connection to the lightning transmitting cable (9). Said cable (9) is responsible for receiving the lightning strike on the outboard (2) through a receiver at the tip of a blade and transferring it to its exit to the hub through the inboard (3). The cable (9) can also be connected to the metal element (4) through another connection point (8') for equipotentialization.

Figure 4:
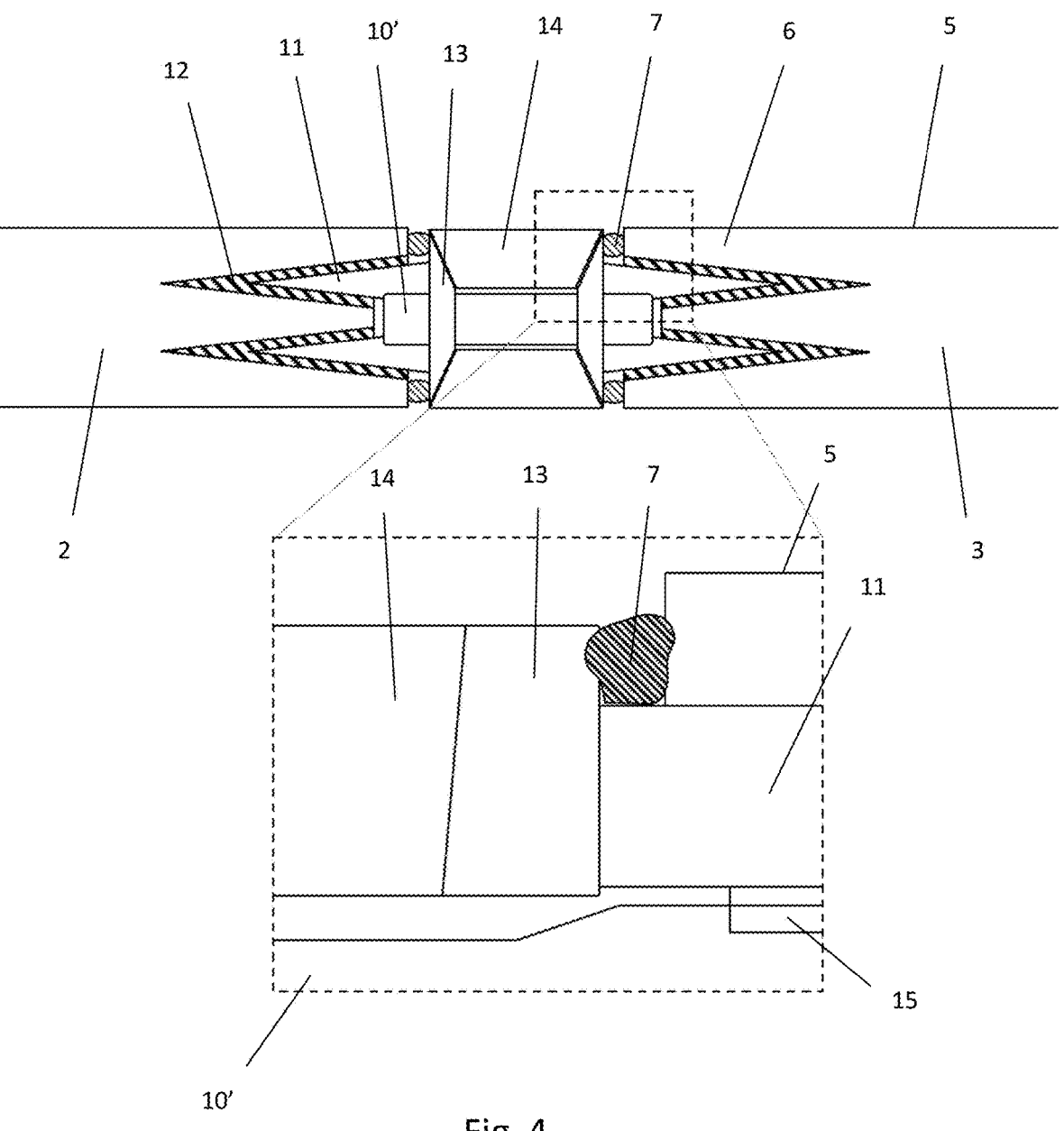
FIG. 4 is the section of the previous figure with a detail of the device of the invention on a practical embodiment of a specific metal joint.

The section in FIG. 4 is made on a specific metal joint. A single bolt (10') is used, screwed between an insert (11) of the outboard module (2) and an insert (11) of the inboard module (3), adding a metal wedge element to the gap formed between the blade modules as a simple prestressing machine. Said element is composed of lateral washers (13) and a central wedge (14) crossed by their corresponding transverse screws (not shown in the figure), whose tightening achieves prestressing. Both the washers (13) and the central wedges (14) have their faces inclined oppositely.

As shown in the detail of FIG. 4, the insert (11) has a threaded area (15) where the single bolt (10'), after slightly widening its diameter, is threaded and fixed. Said insert (11) protrudes from the carbon fibre (6) that houses it, forming a small gap between the cap (5) and the washer (13) where the spark gap (7) is arranged. The smooth face of the washer (13) contacts the spark gap (7) and the inclined face contacts the central wedge (14).

Figure 5:
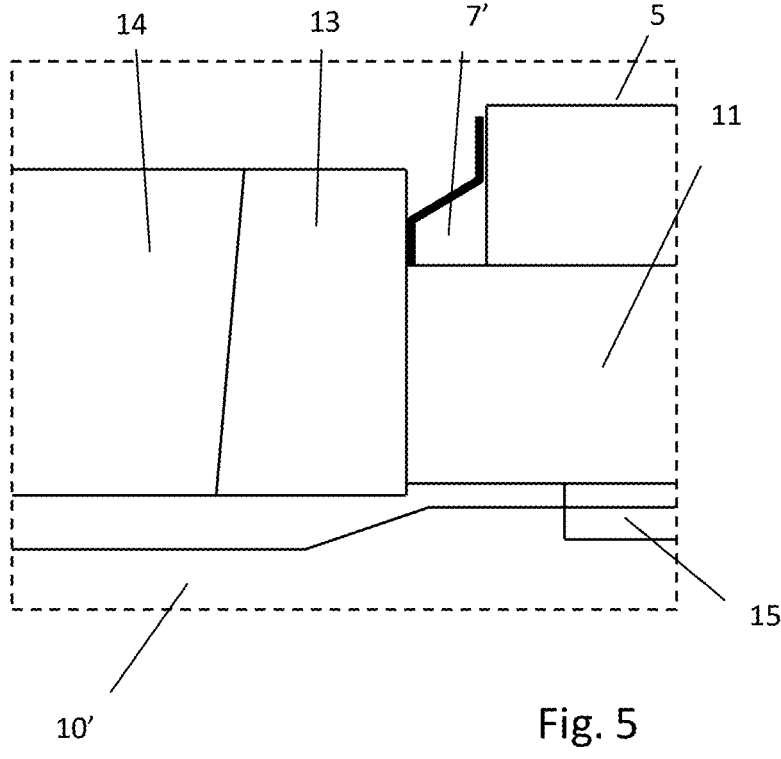
FIG. 5 and FIG. 6 show two possible sections of the device of the invention using different materials.
Figure 5:
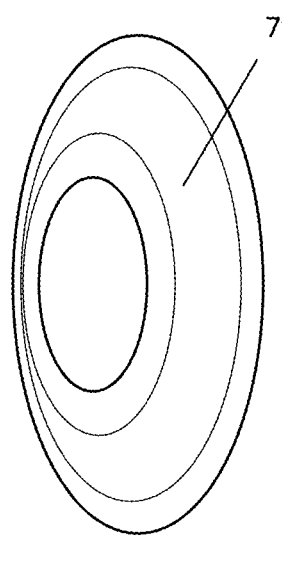
Figure 6:
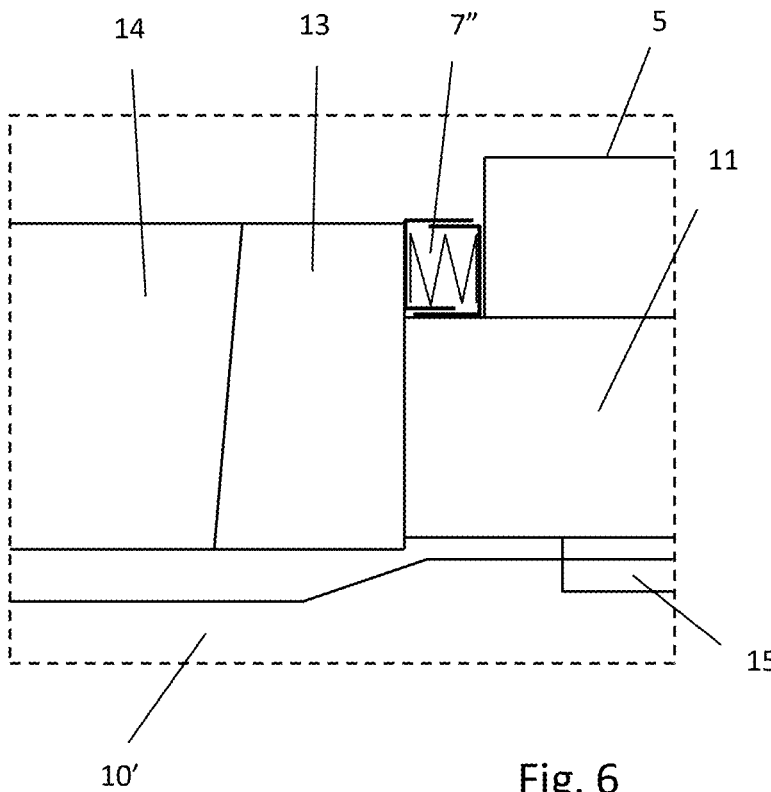
Figure 6:
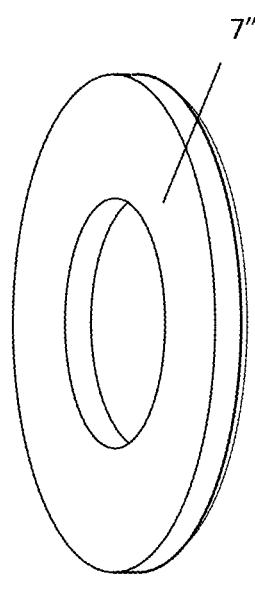

The spark gap (7) is an elastomer that has a toroidal shape, is electrically conductive and is assembled during the blade assembly process, surrounding each and every one of the elements that form the metal joint. The spark gap (7) can be made of a conductive elastomeric material, manufactured by doping with small amounts of conductive material, or alternatively of a metallic material with a geometry that allows it to achieve elasticity. The spark gap (7) has a section with a preferably toroidal shape. As shown in FIGS. 5 and 6, it can have other sections and other materials that improve contact with the composite material and with the metallic part of the joint.

The first figure shows a double ring (7') of elastomeric material with an inclined step between both heights. The ring with the largest diameter is the thinnest and is arranged in contact with the carbon fibre (6) of the cap (5) and the inner ring, with a smaller diameter, is arranged in contact with the washer (13) of the metal joint (4).

The second figure describes the alternative of using a metallic material formed by two C-shaped rings facing and overlapping, with an internal spring (7") that provides the required elasticity.

The invention claimed is:

1. A device for lightning protection in a modular blade (100), wherein metal connection elements are arranged in an upper cap (5) and in a lower cap, both on the side of an outboard module (2) and on the side of an inboard module (3), each of the metal connection elements (4) comprising one or several prestressed bolts (10), which are threaded into inserts (11) that are glued into previously drilled holes in the interior of a carbon fibre composite material (6) by means of an adhesive (12), characterized in that it comprises:
   a spark gap, (7) which is an elastic element with greater electrical conductivity than that of the adhesive (12) used to glue the drilled inserts (11) inside the carbon fibre (6),
   the spark gap (7) is arranged between the cap (5) and the elements of the metal joint
   the spark gap (7) is elastic, which ensures contact with the cap (5) and the metal joining elements during the assembly and operation of the blade.

2. Device for lightning protection in a modular blade according to claim 1, wherein each spark gap (7) has a toroidal shape and surrounds each and every one of the elements that form the metal joint.

3. Device for lightning protection in a modular blade according to claim 1, wherein the spark gap (7) is a conductive elastomer and has a section with protuberances to improve contact with the composite material and with the metallic part of the joint.

4. Device for lightning protection in a modular blade according to claim 1, where the spark gap (7) is formed by a metallic material with a geometry that allows its elasticity.

5. Device for lightning protection in a modular blade according to claim 1, wherein a single bolt (10') is screwed into the inserts (11) of the outboard (2) and the inboard (3) with a metallic wedge element composed of washers (13) and a central wedge (14) crossed by their corresponding transverse screws whose tightening achieves prestressing and the spark gap (7) is arranged between the smooth face of the bushing (13) and carbon fibre (6).

6. Device for lightning protection in a modular blade according to claim 1, where an elastomer is presented with a double ring and an inclined step between both (7'), where the ring with the largest diameter is the thinnest and is arranged in contact with the carbon fibre (6) and the inner ring, with a smaller diameter, is arranged in contact with the washer (13).

7. Device for lightning protection in a modular blade according to claim 1, wherein it presents a metallic material formed by two C-shaped rings facing and overlapping, with an internal spring (7") that provides the required elasticity and is arranged between the carbon fibre (6) and the washer (13).

* * * * *